United States Patent [19]

Medford

[11] 4,285,558
[45] Aug. 25, 1981

[54] CASSETTE HOLDER

[76] Inventor: Miles E. Medford, 1642 Union St., Brooklyn, N.Y. 11213

[21] Appl. No.: 125,110

[22] Filed: Feb. 27, 1980

[51] Int. Cl.³ .................... A47F 7/00; A47F 3/06; A47B 81/00
[52] U.S. Cl. .................... 312/278; 312/117; 312/126; 312/128; 211/55
[58] Field of Search ................ 312/278, 8, 9, 10, 111, 312/126, 128, 117; 206/387; 211/55

[56] References Cited

U.S. PATENT DOCUMENTS

| 42,943 | 5/1864 | Hance | 211/55 |
|---|---|---|---|
| 412,544 | 10/1889 | Rood | 312/128 |
| 676,157 | 6/1901 | Sparks | 312/126 |
| 945,014 | 1/1910 | Boyer | 312/278 |
| 1,106,543 | 8/1914 | Burnham et al. | 312/126 |
| 1,361,451 | 12/1920 | Flannery, Jr. | 211/55 |
| 1,608,625 | 11/1926 | Schwartz | 312/278 |
| 2,735,739 | 2/1956 | Patriarca | 312/128 |
| 3,554,625 | 1/1971 | Sly, Sr. | 312/126 |
| 3,851,938 | 12/1974 | McCowan et al. | 312/111 |
| 3,917,067 | 11/1975 | Brown et al. | 206/387 |

Primary Examiner—Victor N. Sakran
Attorney, Agent, or Firm—Quaintance, Murphy & Richardson

[57] ABSTRACT

A cabinet for storing tape cassette includes a plurality of first compartments arranged in a vertically stepped array for storing a plurality of tape cassettes with each cassette oriented vertically while resting on one end and a plurality of second compartments formed in a plurality of drawers disposed behind the stepped array of first compartments for storing tape cassettes wherein each cassette rests horizontally on its front or back face. The compartments are preferably made of transparent material and a transparent door is provided.

2 Claims, 4 Drawing Figures

CASSETTE HOLDER

BACKGROUND OF THE INVENTION

1. Field of the Invention

The instant invention relates to cabinets and other arrangements for storing tape cassettes and similar articles, and more particularly the instant invention relates to cabinets for storing articles similar to tape cassettes wherein the articles are relatively easy to locate and select.

2. Prior Art and Other Considerations

It is difficult to store tape cassettes in a manner in which individual cassettes are easy to locate and readily accessible. This is due to the particular structure of the tape cassette wherein the cassette is relatively thin and elongated in one direction. If the cassettes are stored in a conventional drawer, it is difficult to locate cassettes because only those cassettes on top are visible. In digging through the piles of cassettes to find a cassette which is not visible, the cassettes on top frequently become burried. Since the top cassettes are generally the ones which are used most often, a frustrating situation results whenever one must search below the top cassettes.

This difficulty also arises when displaying cassettes for sale. It the cassettes are readily available for inspection, then they are subject to theft. On the other hand, if the cassettes are stored in transparent cases, then frequently only the top cassettes are visible. In any event, storing cassettes so as to be easily located and readily selected is a vexing problem both personally and commercially. Accordingly, there is a need for a device or cabinet for storing articles such as tape cassettes.

SUMMARY OF THE INVENTION

It is a feature of the instant invention to provide new and improved facilities for storing tape cassettes and similar articles.

In view of this feature, the instant invention contemplates a cabinet for storing tape cassettes wherein the cabinet includes therein a first stepped array of compartments for storing each cassette in a vertical orientation while resting on one end and further includes a second array of compartments in a plurality of drawers stored behind the stepped array of first compartments wherein the cassettes rest in the drawers in a horizontal orientation on either their front or back faces. In addition, the instant invention contemplates a transparent front access door over the first compartments and a rear door for providing access to the second compartments.

DESCRIPTION OF THE PREFERRED EMBODIMENT

Figure 1:
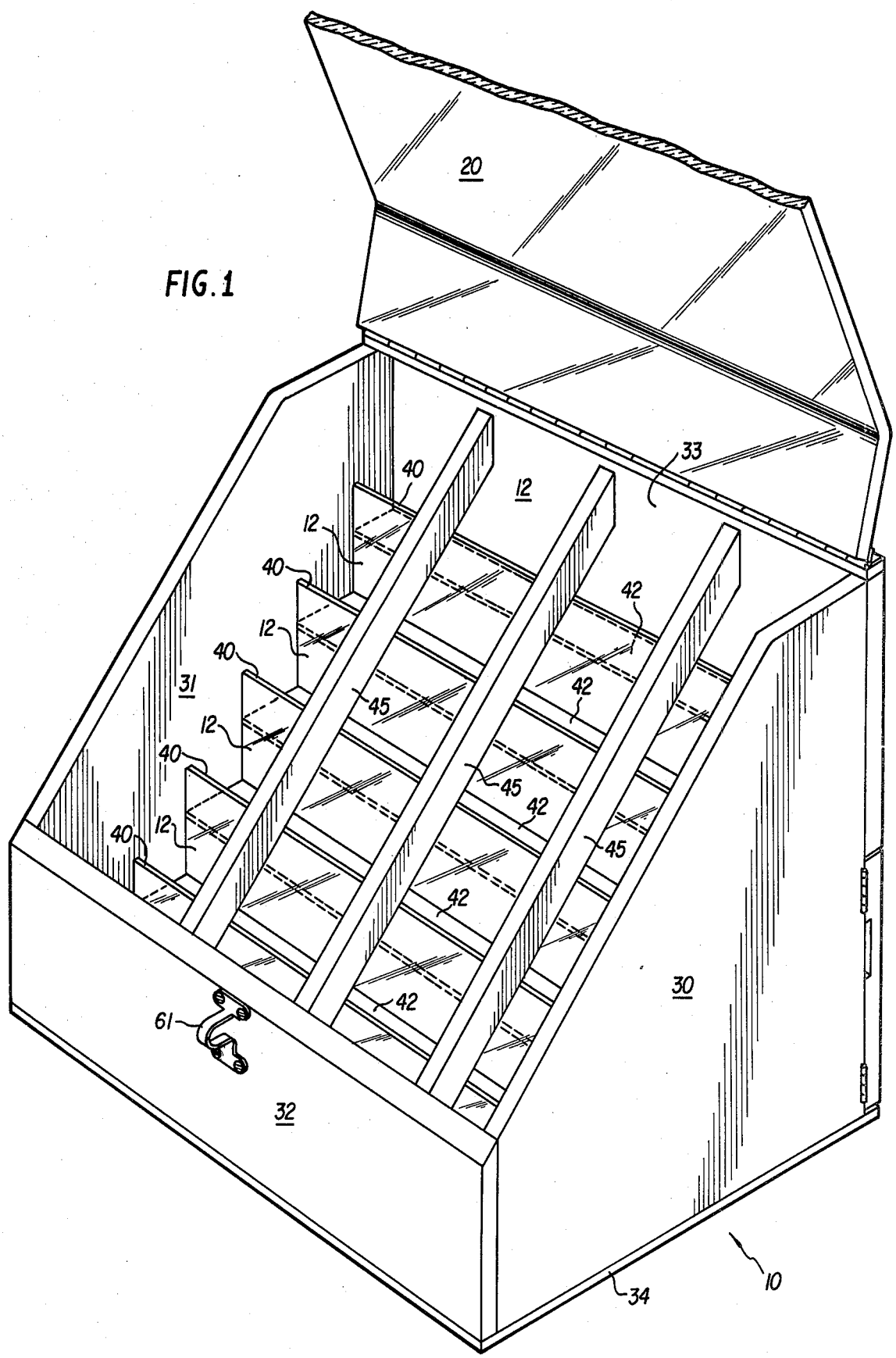
FIG. 1 is a perspective view of a cabinet in accordance with the principles of the instant invention showing the front door open and partially cut away.

Referring now to the drawings, there is shown a cabinet designated generally by the numeral 10 for storing tape cassettes 11 (See FIG. 2.) in a readily identifiable and accessible manner. The tape cassettes 11 are stored vertically while resting on one edge in a first array of compartments designated generally by the numeral 12 and stored horizontally in a second array of compartments designated generally by the numeral 13 formed in a plurality of drawers 14a–14d. The first compartments 12 are accessible by opening a transparent plastic door 20 hinged by a series of hinges or a piano hinge 21 to the cabinet 10. The drawers 14a–14d are accessible via a pair of doors 25 and 26 hinged to the back of the cabinet 10.

In the preferred embodiment, the cabinet 10 has wooden side panels 31, a wooden front panel 32 and a wooden rear panel 33. A clear plastic base 34 is provided to lend rigidity to the structure. The compartments 12 and 13 and drawers 14a–14d are preferably made from transparent plastic. If desired, transparent plastic may also be used to form the panels 31–34.

Referring now specifically to the first compartment 12, it is seen that the first compartments are arranged in a vertically stepped array wherein vertical plastic walls 40 form rear walls for the lower compartments and front walls for the next successive higher compartments in the array. A plurality of horizontally extending shelves 42 ridigly adhered to the vertical walls 40 form the basis of compartment 12. In order to divide the first compartment 12 so that each compartment is only the width of one tape cassette, three struts 45 extend across the compartment 12 on top of the vertical walls 40 and are secured to the front panel 32 and rear panel 33 of the cabinet 10.

The height h from the shelves 42 to the door 20 is always slightly less than the height of a tape cassette 11 when the cassette is stood on its end.

Figure 2:
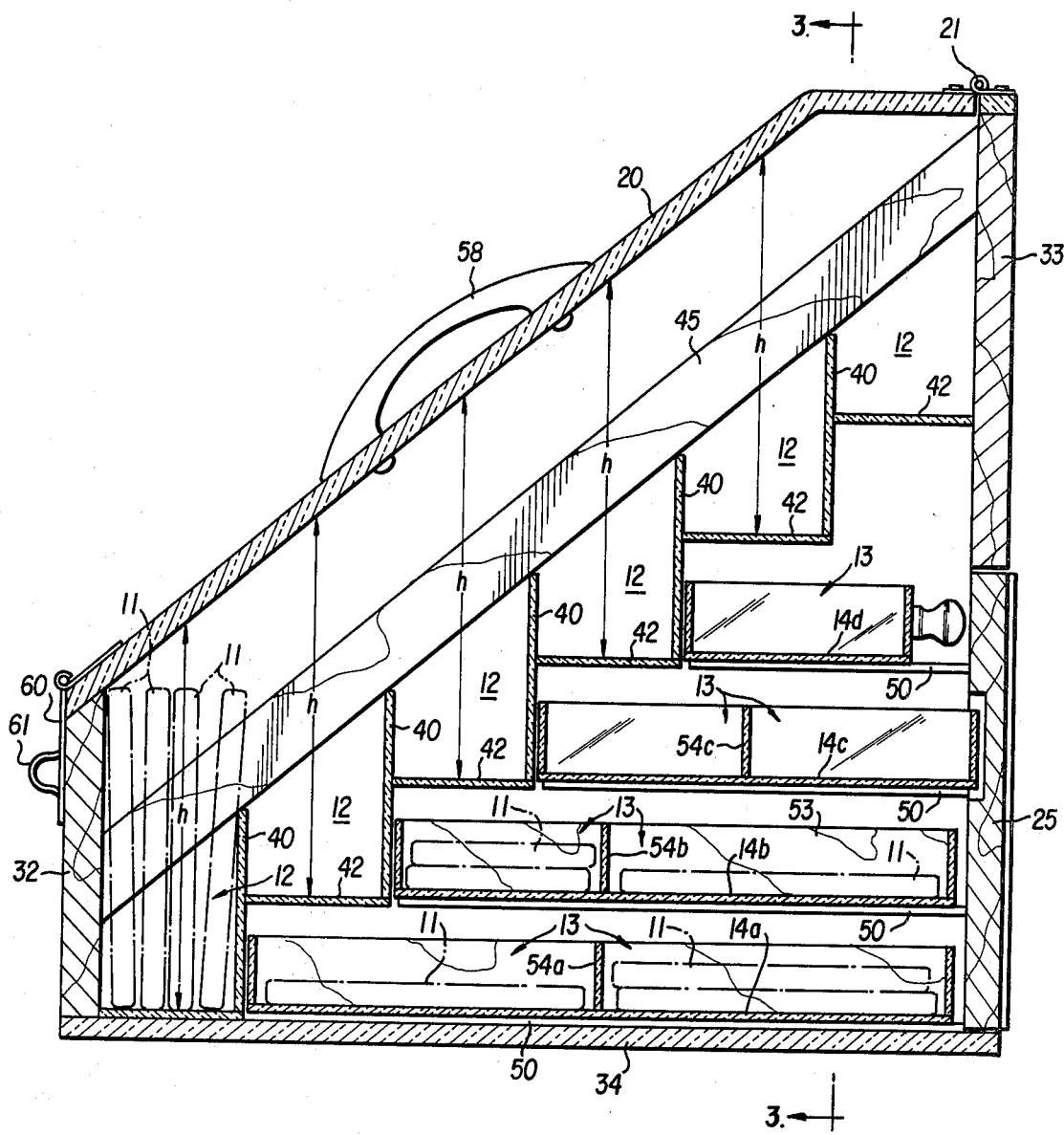
FIG. 2 is a side elevation of the cabinet according to the instant invention taken along Lines 2—2 of FIG. 3 showing the organization of drawers and compartments of the instant invention.
Figure 3:
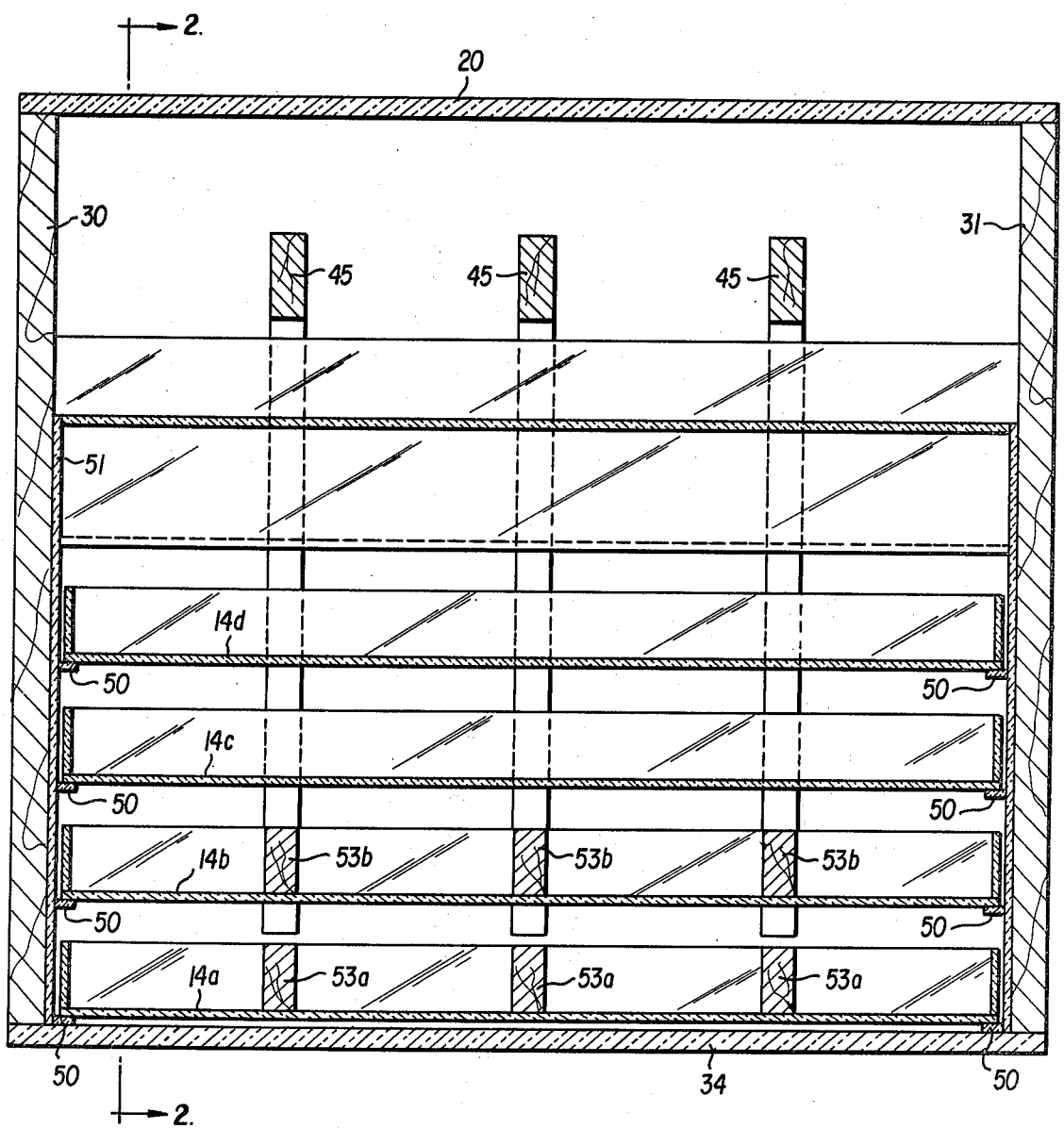
FIG. 3 is a rear elevation of the instant invention taken along Lines 3—3 of FIG. 2.
Figure 4:
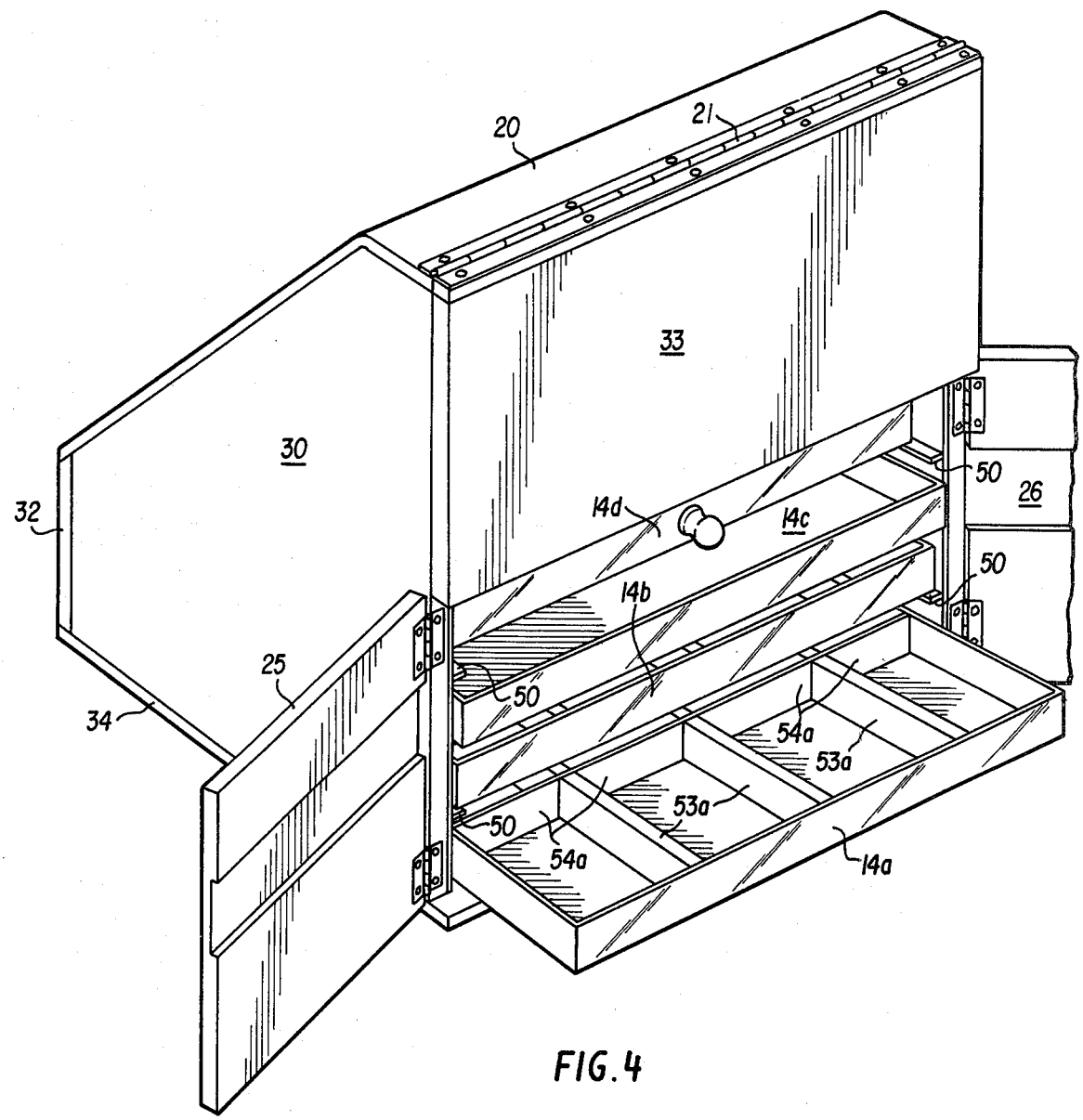
FIG. 4 is a rear perspective view of the instant invention showing a pair of rear access doors open permitting access to drawers within the cabinet.

As is seen in FIGS. 2 and 3, each of the four drawers 14a–14d is supported by a runner 50 which is preferably secured to a plastic side panel 51. In order to form the compartments 13 for the tapes, the bottom drawer 14a is subdivided by struts 53 running from front to back and by dividers 54a which extend in the side-to-side direction so as to form eight compartments, each of which contain two tape cassettes 11. The drawer 14b includes three struts 53b which extend from front to back and divide the drawer into three cmpartments, each of which contains two tape cassettes 11. Drawer 14c has a divider 54c extending from one side to another and divides the drawer sideways into two compartments, each of which contains six tape cassettes lying horizontally. Finally, the top drawer 14d has no dividers and contains six cassettes, each of which rest horizontally.

For the sake of convenience, the door 20 has a handle 58 secured thereto for carrying the cabinet 10 and a hasp 60 which receives a staple 61 to which a padlock is secured for locking at least the front cover closed.

By the aforementioned arrangement, one-hundred forty four tape casettes 11 can be stored in a convenient arrangement wherein the tape cassettes are both easy to locate and accessible. In utilizing the cabinet 10, the most frequently used tape cassettes 11 are mounted in the first compartments 12 while less frequently used tape cassettes are contained in the second compartments 13 within drawers 14a–14d.

The aforedescribed embodiment is merely illustrative of the invention which should be limited only by the following claims.

What is claimed is:

1. A cabinet specifically for storing and displaying a plurality of tape cassettes, the cabinet comprising:

a pair of side panels each having bottom and rear edges which are substantially normal with respect to one another, a top edge parallel with and shorter than the bottom edge and a front edge having a portion parallel with the rear edge and an oblique portion extending at an oblique angle to the other edges from the lower portion of the front edge to the top edge;

a front panel extending between the front edges;

a back panel extending between the rear edges at upper portions thereof;

a rigid, transparent cover hinged to the top edge of the back panel, said cover having one section which is parallel to the top edges and another section oblique to said one section which is parallel to the oblique edges when the cover is closed;

locking means on the oblique section and front panel for locking the cover to the front panel upon closing the cover;

a plurality of front compartments disposed between the panels and stepped vertically with respect to one another and said compartments separated horizontally by vertical dividers, each front compartment including a horizontal shelf and vertical wall whereby the front compartments each contain a plurality of tape casettes resting on end therein;

a plurality of draw runners on the side panels and located at the same heights as some of the horizontal shelves of the front compartments;

a plurality of drawers slidable on the runners and each having a height less than the vertical distance between the shelves so as to fit under the shelves, at least some of said drawers including vertical partitions for subdividing the drawers into compartments for holding tape cassettes, and said drawers being accessable below the back panel, and door means beneath the back panel for shutting behind the drawers when the drawers are shut.

2. The cabinet of claim 1 wherein the dividers between the front compartments extend above the vertical walls between the top of the rear panel and the front panel.

* * * * *